Feb. 20, 1934.   B. T. HEADLEY ET AL   1,948,219
GLASS WORKING METHOD AND MACHINE
Original Filed June 17, 1914   6 Sheets-Sheet 2

Inventors.—
Benjamin T. Headley.
Parke H. Thompson
by their Attorneys.—

Feb. 20, 1934.   B. T. HEADLEY ET AL   1,948,219
GLASS WORKING METHOD AND MACHINE
Original Filed June 17, 1914   6 Sheets-Sheet 3

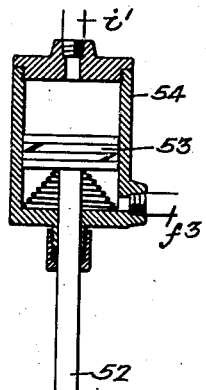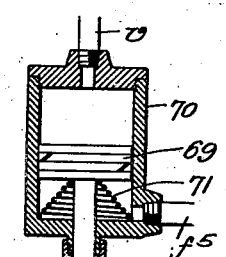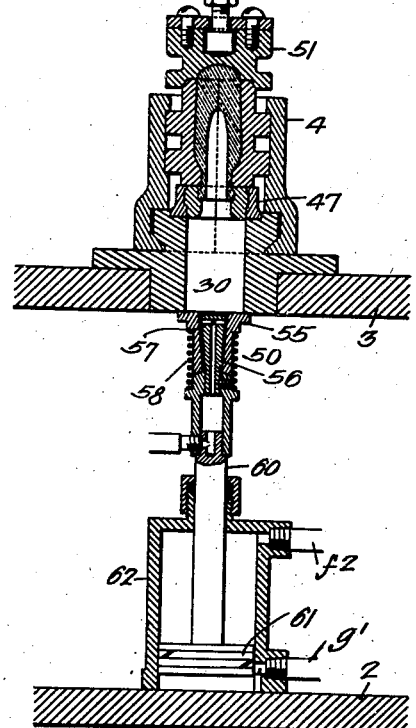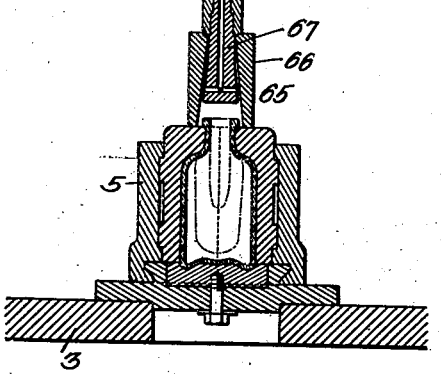
Fig. 5.
Fig. 6.

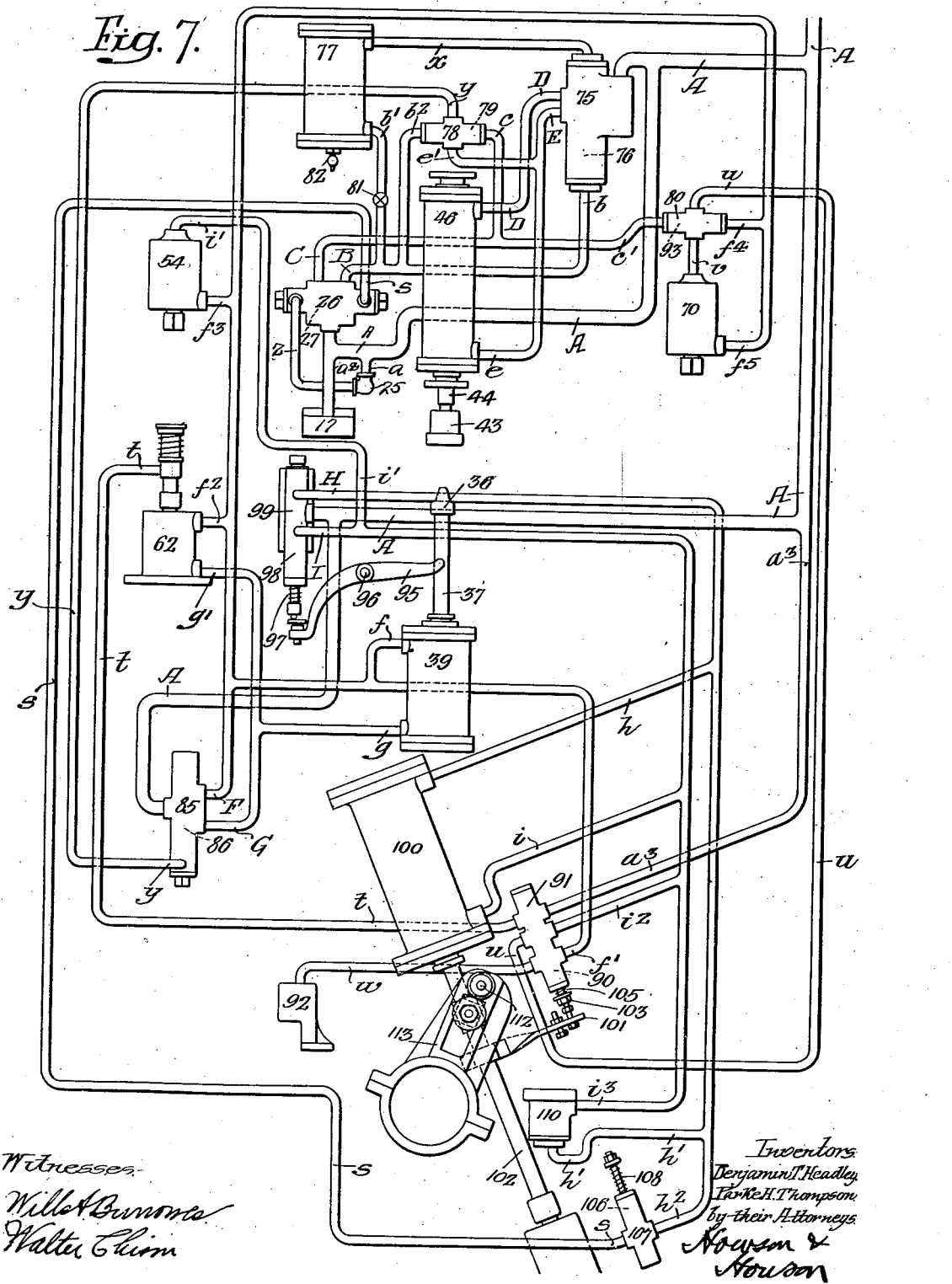

Patented Feb. 20, 1934

1,948,219

UNITED STATES PATENT OFFICE 1,948,219

GLASS WORKING METHOD AND MACHINE

Benjamin T. Headley and Parke H. Thompson, Millville, N. J., assignors, by mesne assignments, to Hartford-Empire Company, Hartford, Conn., a corporation of Delaware Continuation of application Serial No. 845,684, June 17, 1914. This application November 10, 1915. Serial No. 60,744

55 Claims. (Cl. 49—5)

Our invention relates to methods and machines employed in the manufacture of glass bottles; and the object of our invention is to provide a machine more particularly available for the manufacture of bottles having small mouths. Our improved machine is semi-automatic; only requiring the attendance of an operator, and a boy attendant to transfer the blanks or parisons from the blank-molds to the blow-molds for the final blowing operation.

In our present machine, we have employed certain features shown in the structure forming the subject of our application for patent, filed Oct. 25th, 1915, Serial No. 57,800½ whereby the initial operations of the machine can be commenced, and in the present machine, the operation thereof is started by an operator pressing a lever which controls the cutting mechanism for severing the charge of glass from the gather, which operation is immediately followed by the delivery of air or other fluid to force the charge of glass into one end of a blank-mold having a suitable neck-mold structure and mouth-forming pin combined therewith whereby a finished mouth and neck may be imparted to the blank or parison.

These and other features of our invention will be more fully described hereinafter, reference being had to the accompanying drawings, in which:

Fig. 4a is a sectional view on the same plane as Fig. 4, showing the carrier for the mouth-forming pins employed with the blank-molds, which carrier is disposed below the mold-carrying table;

Fig. 5 is a sectional elevation of a blank-mold and lower blow-head therefor, on the line V—V, Fig. 2;

Fig. 6 is a sectional elevation of a blow-mold with the blow-head therefor in position, on the line VI—VI, Fig. 2;

Fig. 7 is a diagrammatic plan view of the piping for carrying fluid under pressure to operate the several parts of the machine.

Figure 1:
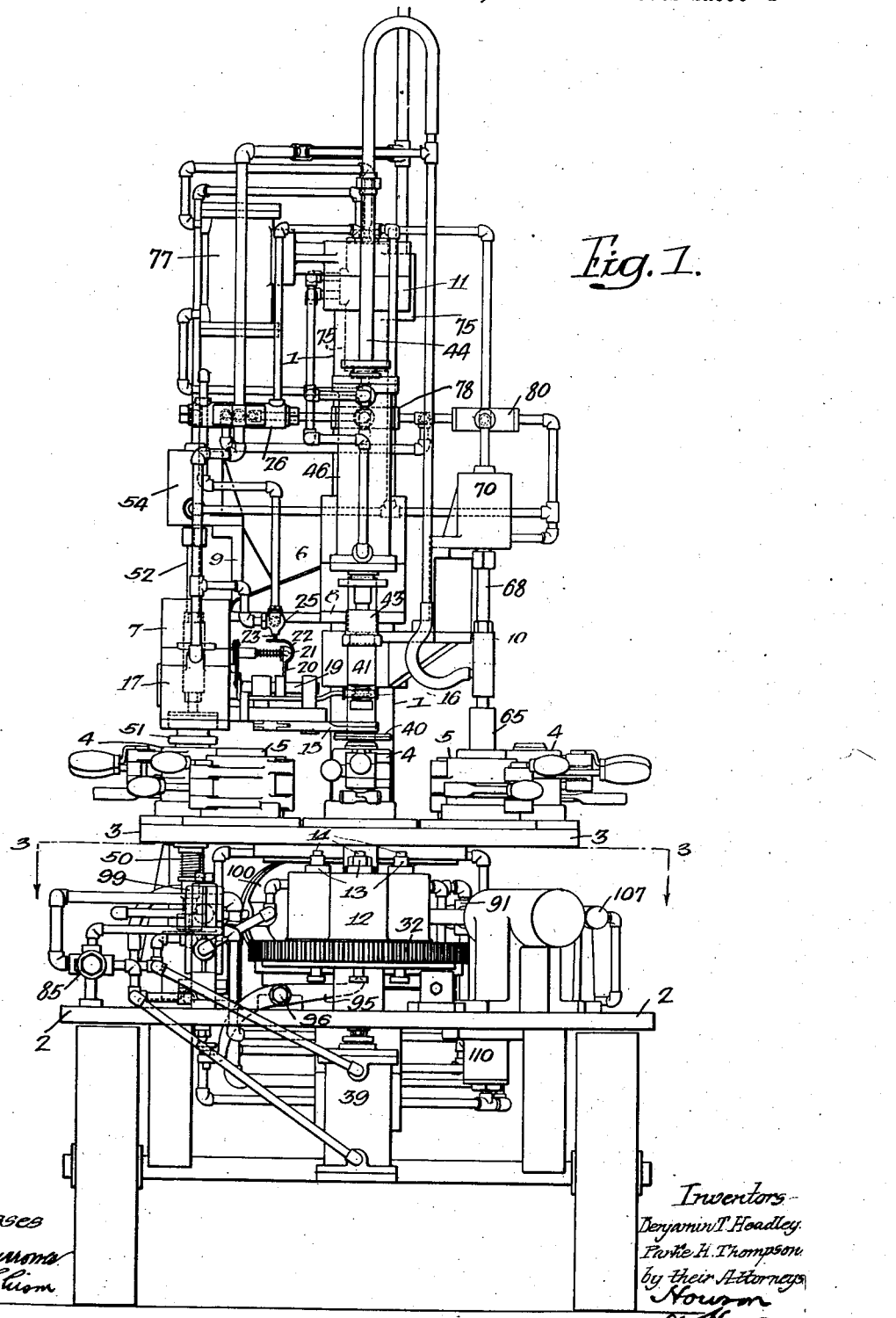
Figure 1 is a front elevation of a glass working machine embodying our invention.
Figure 2:
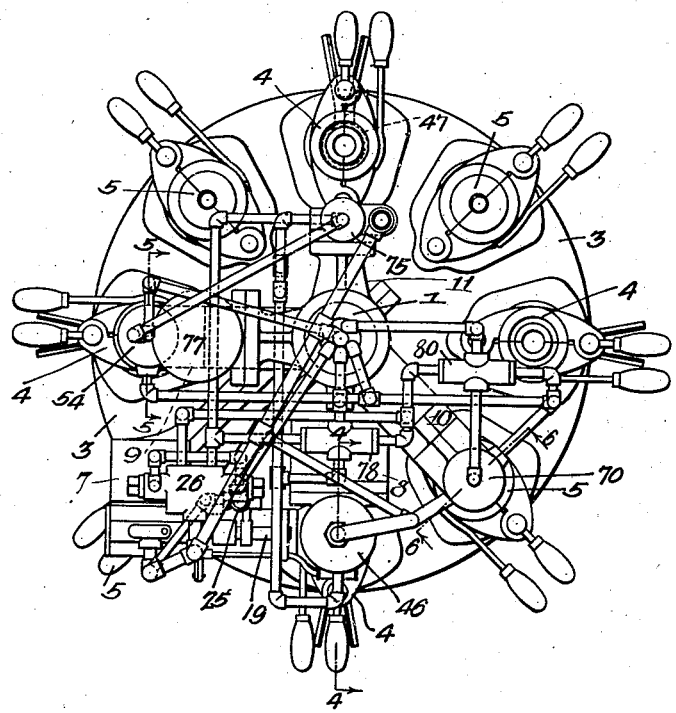
Fig. 2 is a plan view of the same.

Certain features shown herein are similar to those shown in the patent granted to B. T. Headley and M. C. Bard, on the 20th day of February 1912, No. 1,017,870.

Our present machine comprises a central stem 1 mounted on a table or platform 2, which is suitably supported by wheels whereby it may be moved to convenient points for operation, while rotatably mounted with respect to said standard is a table 3 upon which blank-molds 4, and blow-molds 5 are alternately disposed. The standard 1 carries a plurality of arms or brackets 7, 8, 9, 10 and 11, some of which are mounted on a sleeve 6, while others are mounted on other sleeves on the standard. The mounting of the arms in groups will depend largely on the particular design of machine. These arms support the several valves and cylinders whereby the various operations upon bodies of glass within the molds may be accomplished, as hereinafter described, while the table 2 carries a rotatable member 12 with a series of vertically movable plugs 13 having mouth-forming pins 14, and the necessary valves, cylinders and other mechanism to rotate the same, as well as to rotate the mold-carrying table 3.

Figure 8:
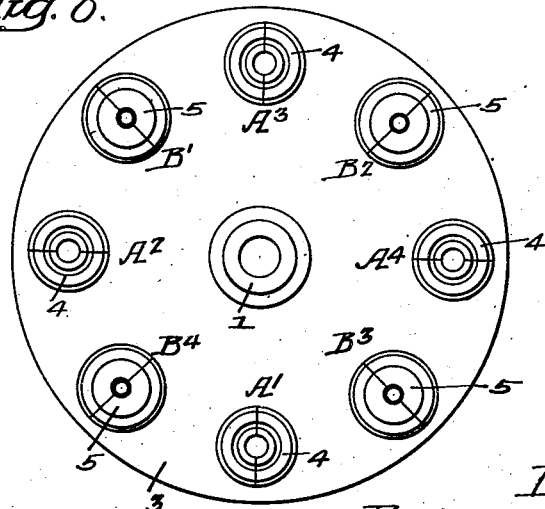
Fig. 8 is a diagrammatic plan view of the mold-carrying table and the molds thereon.
Figure 3:
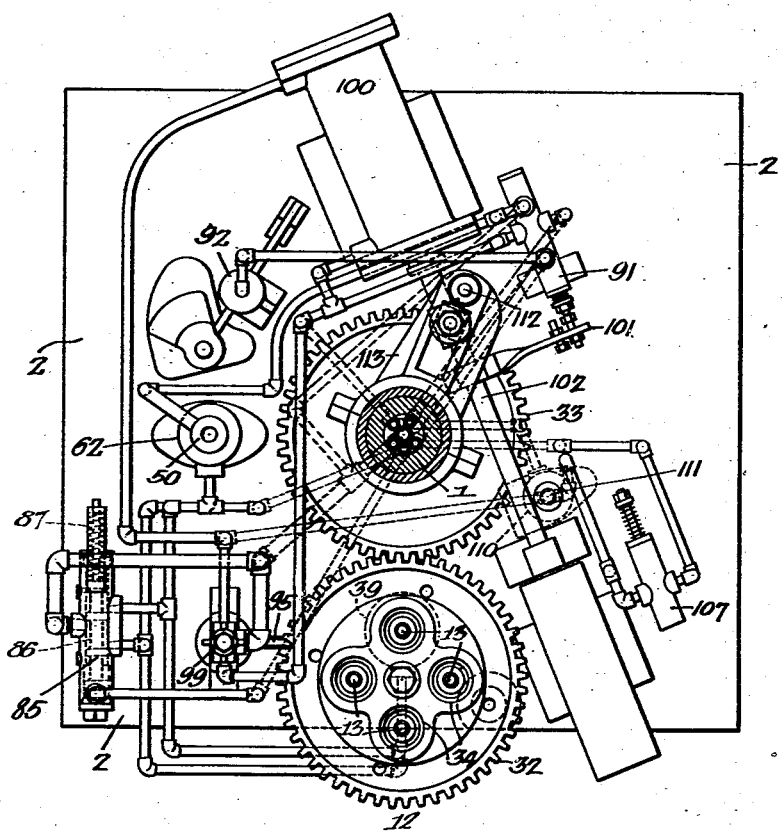
Fig. 3 is a sectional plan view on the line III—III, Fig. 1.
Figure 4:
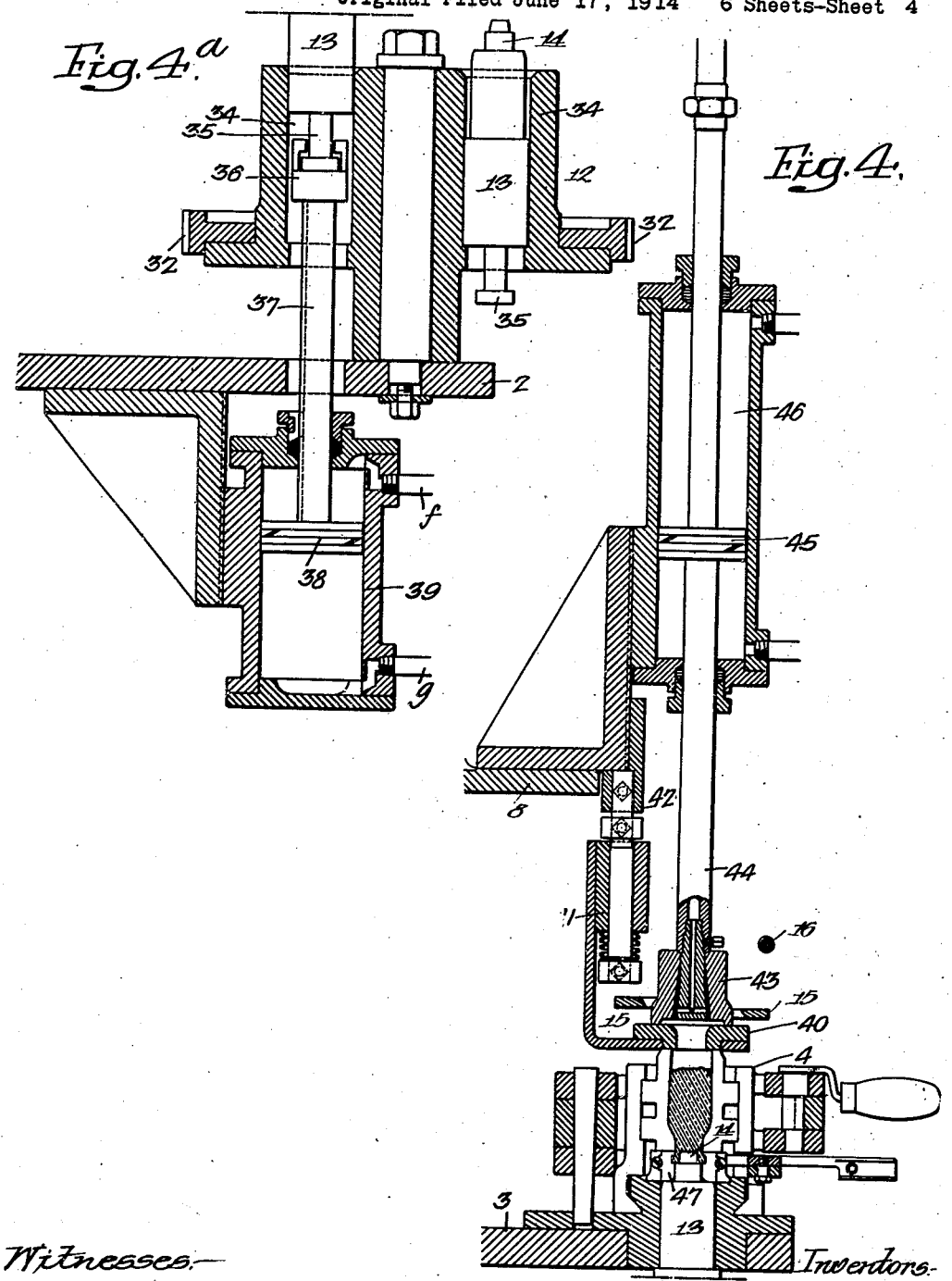
Fig. 4 is a sectional elevation of a blank-mold and upper blow-head therefor, on the line IV—IV, Fig. 2.

Figs. 1 and 7 show the machine in position for one of the blank-molds to receive a charge of glass, and such glass is dropped into a blank-mold 4 when in position A', (Fig. 8). When this is done, an operator actuates the shears 15 by resting the gathering rod upon a controlling handle 16, and the movement of this handle operates a rotary valve (such as shown at 13, in Fig. 6, of Patent No. 1,017,870), controlling the delivery of air to a cylinder 17 carrying a piston which serves to retract the shears carrying mechanism and cause the blades of the same to close and sever the charge of glass in the mold from that carried by the gathering rod. The shears and operating mechanism therefor are carried by the arm or bracket 7. (This mechanism is fully described in the patent above referred to and forms no part of the present invention.)

On the return movement of a sliding rod 19 employed for operating the shears, such movement opening said shears, a lever 20 pivoted at 21 is actuated, which lever has an arm 22 adapted to contact with a valve stem 23 of a valve 25, and open said valve. Upon the continued rearward movement of the shears operating rod 19, the lever 20 is released, allowing said valve 25 to close. The valve, however, has been open a sufficient length of time to allow air to flow from a branch a of a main supply pipe A through a pipe z to one end of a valve casing 26, within which a valve 27 is contained, moving said valve to a position permitting the flow of air from the main air supply pipe A to the several portions of the structure as hereinafter described.

As described above, the mold-carrying table has blank-molds 4 and blow-molds 5 set alternately adjacent its peripheral edge, and motion is imparted to this table in a manner substantially similar to the manner of operating the structure shown in Patent 1,017,870, or the machine of our pending application, before referred to; provision being made for stopping the machine at regular intervals; a complete revolution being made up of a series of quarter turn movements successively applied by the usual means set forth in the patent and application referred to.

Below the table and positioned to bring individual mouth-forming pins into alignment with the blank-molds when the latter are moved to the charging position upon the partial movements of the table, is a rotatable member 12 substantially similar to the blank-mold carrying structure of the prior patent noted, and this member carries a series of vertically movable plugs 13, having mouth-forming pins 14; said member being toothed at 32 and meshing with a gear wheel 33 journaled on the stem 1, and movable with the table 3 so that a fresh plug with a mouth-forming pin will be positioned for each movement of the table, ready for coöperative engagement with the neck ring or mold of one of the blank-molds.

The plugs 13 are slidably mounted in cups 34 of the member 12 and have depending stems 35 for engagement by a yoke member 36 carried by a piston rod 37, having a piston 38 in a cylinder 39 to which fluid under pressure is admitted to raise and lower the piston rod 37 and with it one of the plugs 13 with its mouth-forming pin 14.

Glass is poured into one of the blank-molds, preferably through an apertured plate 40, carried by a spring-supported arm 41 hung from a bracket 42, carried by the arm 8, and after the glass has been poured into said mold and the shears have been operated, a blow-head 43 is lowered; said blow-head being carried by a rod 44 connected to a piston 45 movable within a cylinder 46, supported by the arm 8, to which cylinder motive fluid is admitted in the usual manner; said piston rod being hollow in order that air may be delivered through the same to the blow-head after the latter has been lowered into contact with the plate 40 over the blank-mold. This engagement moves the plate 40 into contact with the blank-mold so as to permit a charge of air delivered by said blow-head to enter the mold; forcing the glass in the same into a neck-mold 47 positioned at the bottom of said blank-mold and around the mouth forming pin 14 of the plug 13, which finishes the mouth and effects the formation of a recess in the blank or parison. When this operation is finished, the plug 13 with its mouth-forming pin 14 is withdrawn by the mechanism described, and then the table is given a quarter turn, bringing the blank-mold into position for engagement with a lower blow-head 50 at station A², which forces counterblowing air through the neck-mold into the recess at the mouth of the blank or parison, enlarging said recess and moving the glass upwardly against a plate 51 carried by a rod 52 depending from a piston 53 mounted within a cylinder 54, carried by the arm or bracket 9, to which cylinder air is admitted and exhausted, in the usual manner.

The lower blow-head 50 comprises an outer member 55 for engagement with the table at the opening 30 through which the plug 13 rises for coöperation with the neck-mold, and a central member 56 having passages 57 for the delivery of air; a spring 58 being interposed between the parts 55 and 56 so as to keep the valve 80 normally closed when not in action. This blow-head is carried by a piston rod 60 operated by a piston 61 within a cylinder 62. Upon the conclusion of this operation, the table is moved another quarter turn to bring the mold to station A³, and an attendant opens the blank-mold, removes the blank from the same by the aid of the neck-mold, inverts it, and drops it into one of the blow-molds 5, which blow-mold is then closed and the blank placed therein permitted to remain and cool slightly before air is applied to blow the blank to finished form; such length of cooling being equal to the time required for a half revolution of the machine.

When the blow-mold containing a blank reaches the blowing position at station B³, a blow-head 65 is dropped onto the same; said blow-head comprising a shell 66 covering the mouth of the blank, which shell is movable with respect to an internal air delivery member 67 carried at the end of a rod 68, and forming with the shell 66 a valve. The rod 68 is connected to a piston 69 within a cylinder 70, carried by the arm or bracket 10; said piston being raised and lowered by air under pressure, and a spring 71 being employed to cushion the downward movement of the same as said blow-head 65 is brought into contact with the blow-mold. The table is then moved a quarter turn; the finished bottle being allowed to cool in the blow-mold, and then the bottle is removed and transferred to a lehr in the usual or well known manner from the blow mold at station B¹.

The several valves controlling the operation of the structure, and the pipe conveying fluid under pressure are shown in Fig. 7 and are more fully referred to in the description of operation, which is as follows:

The initial charge of glass is dropped into the blank-mold when in position A', Fig. 8. The shears are then operated, and on the return movement of operating rod 19 for the same, the valve 25 is opened. The continued rearward movement of the shears operating rod allows said valve 25 to close. However, this valve is open for a sufficient length of time to allow air to flow from the branch $a$ of the main air supply A through the pipe $z$ to one end of the valve casing 26, moving a piston valve 27 therein to such a position as to allow air to flow from the main air supply pipe A through the said valve 27 to a pipe B connected to said valve casing 26, and its branches $b$, $b'$ and $b^2$. The moving of the valve 27 also throws a pipe C and its branches $c$ and $c'$ open to exhaust. Air under pressure supplied to the pipe $b$ is directed to the lower side of an equalizing valve casing 75, (carried by the arm or bracket 11) raising an equalizing piston valve 76 therein. Air flowing through the pipe $b'$ passes to an equalizing tank 77. Air supplied to the pipe $b^2$ is directed to one end of a valve casing 78, moving a piston valve 79 mounted within the same to a position in which pipes $y$ and $e'$ are in direct communication with each other; the pipe C being open to exhaust, air is exhausted from one end of valve casings 78 and 80 through pipes $c$ and $c'$.

Raising the piston valve 76 in the casing 75, directs air from the main air supply pipe A through the said valve to a pipe D; exhausting air from the pipe E and its branches $e$ and $e'$. The air directed to the pipe D flows to the upper end of the cylinder 46 to act upon the piston 45 and lower the blow head 43 over the charged blank-mold 4, to force the glass therein into the neck-mold and around the mouth-forming pin 14; the air being exhausted from the lower end of said cylinder 46 and one side of the valve casing 78 through the pipe E and its branches $e$ and $e'$.

The blow-head 43 controlled by the cylinder 46 is allowed to remain over the blank-mold for a sufficient length of time to force the charge of glass compactly around mouth-forming pin 14. This time is controlled in the following manner: Air flowing through the pipe $b'$, (its progress being under the control of a valve 81) enters the tank 77 and flows from the same through a pipe $x$ to the upper side of the equalizing valve 76 in the casing 75. When the pressure in this tank becomes equal to the pressure on the under side of the valve 76, (subject to the control of a pet cock 82 in the bottom of said tank, which pet cock is normally open,) the valve in the casing 75 is forced down, exhausting the air from the upper end of the cylinder 46 via the pipe D, and supplying air under pressure to the lower end of said cylinder via the pipe E and its branch $e$; thereby raising the blow-head from the blank-mold. The air directed to the pipe $e'$ flows through the piston valve 79 in the casing 78, to the pipe $y$, and thence to one end of a valve-casing 85, moving the piston valve 86 therein against the action of a spring 87.

Movement of the valve 86 in the casing 85 allows air to flow from the main air supply A through said valve to a pipe F and its branches $f$, $f'$, $f^2$, $f^3$, $f^4$ and $f^5$; permitting a pipe G and its branches $g$ and $g'$ to exhaust through said valve 86. Air supplied to the pipe $f$ is directed to the upper end of the cylinder 39 for action upon the piston 38 therein to withdraw the plug 13 and mouth-forming pin 14 from the blank-mold. Air supplied to the pipe $f'$ flows through a valve 90 in the casing 91 to a pipe $w$ connected to the upper end of a cylinder 92, thereby withdrawing a locking pin from the rotating table 3. Air supplied to the pipe $f^2$ is directed to the upper end of the cylinder 62 for action upon the piston 61 therein to lower the blow-head 50 from the under side of the table beneath the blank-mold; the cover 51 being raised from the top of said blank-mold by air supplied to the lower end of the cylinder 54, through the pipe $f^3$. Air supplied to the pipe $f^4$ moves a valve 93 in the casing 80, to permit exhaust of air from the upper end of the cylinder 70 via a pipe $v$; the blow-head 65 controlled by said cylinder being raised from the blow-mold by application of air to the lower end of the cylinder 70 through the pipe $f^5$, to act upon the piston 69 therein. Exhausting the air from the pipe G and its branches $g$ and $g'$ exhausts the air from the lower ends of the cylinders 39 and 62, respectively.

As the piston 38 in the cylinder 39 is lowered by air supplied through the pipe $f$, the yoke-head 36 of the piston rod 37 strikes one end of a lever 95 pivoted at 96, while the opposite end of said lever, being in contact with the stem 97 of a piston valve 98 in a casing 99, raises said stem.

Raising the valve 98 in the casing 99 supplies air under pressure to a pipe H and its branches $h$, $h'$ and $h^2$, and the raising of said valve places a pipe I and its branches $i$, $i'$, $i^2$ and $i^3$ open to exhaust through said casing.

Air applied to the pipe $h$ flows to one end of a table-moving cylinder 100 which, through mechanism clearly set forth in our pending application, effects movement of the mold-carrying table one-quarter of a revolution; a bracket 101 carried by the piston rod 102 connected to the piston in the cylinder 100 moving away from the stem 103 of the valve 90 in the casing 91. A spring 105 is employed to return said valve 90 to its normal position in the casing. Upon nearing the end of its movement, the bracket 101 strikes the stem of a valve 106 in a casing 107; moving the same against the action of a spring 108 mounted on said stem. Air supplied to the pipe $h'$ enters the lower end of a cylinder 110, raising a piston therein so that the head of a rod 111 carried by said piston will be in registry with the table moving pin 112 when the table moving arm 113 reaches the end of its movement.

Air is exhausted through the pipe I and its branches through pipe $i'$, from the upper end of the cylinder 54; through pipe $i$, from one end of cylinder 100; through pipe $i^2$ from one port of the valve casing 91, and through pipe $i^3$ from the upper end of the cylinder 110.

When the bracket 101 moves away from the stem of the valve 90 in the casing 91, said valve is moved by a spring 105, thereby cutting off the flow of air from the pipe $f'$ to the pipe $w$ and cylinder 92, allowing a locking-pin controlled by said cylinder to rise against the under side of the table 3 in the path of an aperture therein designed to receive the same. Communication between the pipe $i^2$ and a pipe $u$ leading to the valve-casing 80, is broken, and air is caused to flow from the main air supply branch $a^3$ to a pipe $t$, which delivers a supply of air to the blowhead 50 controlled by the cylinder 62.

When the table moving arm has completed its movement of 90°, the locking pin enters an aperture in the table and holds it against further movement. The bracket 101 has then finished its movement and has moved the piston valve 106 in the casing 107, permitting the flow of air from the pipe $h^2$ to a pipe S which leads to one end of the valve-casing 26. This moves the valve 27 therein and starts the machine on its return movement as follows:

The movement of the valve 27 in casing 26 exhausts air from the pipe B and its branches $b$, $b'$ and $b^2$, from the equalizing valve-casing 75, tank 77, and one end of valve casing 78. This same movement directs air from the main air supply A to the pipe C and its branches $c$, $c'$. The air being exhausted from one end of the valve-casing 78 and applied at the other end through the pipe $c$; the piston valve 79 therein is moved, exhausting the air from the valve-casing 85 via the pipe $y$. Exhausting the air from one end of the piston-valve in the casing 85, permits a spring 87 therein to move said valve to a position permitting the exhaust of air from the pipe F and its branches $f$, $f'$, $f^2$, $f^3$, $f^4$ and $f^5$, and applying air under pressure from the pipe A to the pipe G and its branches $g$ and $g'$.

Air applied via pipe $g$ to the lower end of cylinder 39 and exhausted via pipe $f$ from the upper end of said cylinder causes the piston 38 to raise a plug 13 with a mouth forming pin 14 into the bottom of a blank-mold. During this movement, the head 36 moves away from the lever 95, allowing the piston-valve 98 in the chamber 99 to descend under the influence of its spring 97. Air applied to the lower end of the cylinder 62 via pipe $g'$ and exhausted from the upper end via pipe $f^2$, raises the piston 61 to lift the blow-head 50 controlled thereby against the under side of the table 3, beneath a blank-mold 4. As the blow-head 50 is at this time supplied with air under pressure from the line A, branch $a^3$ and pipe $t$, it will deliver air into the cavity formed by the neck pin to form a parison and prevent the glass in the mold from collapsing. The air is exhausted from the cylinder 54 via pipe $f^3$. Air is exhausted from the lower end of the cylinder 70 via pipe $f^5$ and from one end of the valve 93 in the casing 80 via pipe $f^4$; and air being applied to the opposite end of said valve 93, it is moved into a position allowing direct communication between the pipes $u$ and $v$.

Lowering the piston-valve 98 in the chamber 99 exhausts air from the pipe H and its branches $h$, $h'$ and $h^2$; and applies air under pressure to the pipe I and its branches $i$, $i'$, $i^2$ and $i^3$. Air directed to the pipe $i^3$ and exhausted via pipe $h$, will lower the piston in the cylinder 110, and withdraw the table moving pin 112 from the table.

Air directed to the pipe $i'$ lowers the piston 53 in the cylinder 54 bringing the cover plate 51 down over a blank-mold, and when air is directed to pipe $i$ and exhausted from pipe $h$, the piston in the cylinder 100 is retracted. Upon the initial movement of such retraction, the bracket 101 moves away from the valve-casing 107, allowing the piston valve 106 therein to be moved by its spring 108, closing communication between the pipe $h^2$ and the pipe $s$.

When nearing the end of its return movement, the bracket 101 again strikes the stem 103 of the valve 90 in the casing 91, moving the valve therein. The movement of this valve establishes a direct passage between the pipes $f'$ and $w$; $i^2$ and $u$, and cuts off passage between pipes $a^3$ and $t$.

The communication between $i^2$ and $u$ allows air to flow from pipe $i^2$ through the pipe $u$, valve 93 and pipe $v$ to the upper end of the cylinder 70, thereby lowering the blow-head 65 controlled by said cylinder over the blow-mold; the air having been previously exhausted from the lower end of said cylinder via pipe $f^5$. The communication established between the pipes $a^5$ and $t$ supplying air to the blowhead 50 controlled by the cylinder 62 during the rearward movement of the arm 113 is cut off at the completion of its movement.

At the end of the backward movement of the table moving arm 113, the pin 112 enters an aperture in the table, ready to again move the latter a quarter turn, or 90°.

The manner of operating the machine in the formation of the blanks or parisons and the finished, blown, bottles, is more fully explained by reference to the diagrammatic view, Fig. 8, in which a series of blank-molds 4 are shown in positions "A'", "A²", "A³" and "A⁴", alternating with a series of blow-molds 5, shown in the positions "B'", "B²", "B³" and "B⁴".

"A'" represents a blank-mold in the charging position. After the charge of glass has been acted upon by the pressure of air from above to lower it in the mold and cause it to form around the end of a mouth-forming pin and within the neck-mold, and said mouth-forming pin has been withdrawn, the table is moved a quarter-turn by the means referred to; bringing said blank-mold to the position "A²". At this point a cap plate is lowered onto the blank-mold, and pressure from the lower blow-head 50 lifts the glass within the mold to form the complete parison. When this is completed, the blow-head and cap plate are withdrawn and the table again moved a quarter-turn; bringing the blank-mold to the position "A³". The blank-mold is now opened and an attendant removes the blank, inverts it, and places it in a blow-mold at position "B'". The table is again moved a quarter-turn, bringing the blank-mold to the position "A⁴" and the blow-mold to the position "B²". This permits the blank in the blow-mold to set slightly and the blank-mold to cool. The table is then moved another quarter-turn; bringing the first-mentioned blank-mold to the charging position "A'", and the blow-mold containing the blank or parison to the position "B³" where it is engaged by the blow-head 65 and the blank therein blown to finished form. Another quarter-turn of the table brings the blow-mold to the position "B⁴" where the finished bottle is allowed to cool, and the freshly-charged (first-mentioned) blank-mold is advanced to position "A²". On the next quarter-turn of the table, the blow-mold advances to the position "B'" where the finished bottle is removed, and the blank-mold with the finished parison is brought to the position "A³". Immediately after the finished bottle is removed from the blow-mold at "B'", the finished parison is taken from the blank-mold at "A³" and inserted in said blow-mold at "B'", as before set forth. This sequence of events is carried on continuously in the operation of the machine; the finished bottles being carried to a suitable lehr when taken from the blow-mold at position "B'".

This application is a continuation of our application Serial No. 845,684, filed June 17th, 1914.

By the words "predetermined timed relations" we do not intend to limit ourselves to a fixed timed relation, since adjusting means may be employed for varying the time in accordance with the ware produced, the operating conditions etc.

The features of this application are not confined to use in machines of the intermittent rotary type, an example of which is illustrated herein, but may be employed to advantage in installations of various other types including those in which continuously rotated mold carriers are employed or in which the molds are supported upon stationary supports.

The division of the blank forming operations at different places in the horizontal travel of the molds permits separate operations in different blank molds at the same time and thus increases the production speed of the machine. In addition, the provision for the finish blowing of a parison or blank while another charge of glass is delivered to, or is being compacted in, the blank mold in which that parison or blank was formed and the provision for the overlapping relation of the cooling of the finished article formed from said parison with the counterblowing of the compacted charge forming another blank or parison, permit an exceptionally efficient use of the molds because a greater number of articles per mold per minute can be produced than has been possible in prior methods and machines.

We claim:

1. In a glass working machine, a blank-mold, a blow-head above said blank-mold and with which it is adapted to register, a support for said blow-head, a pouring guide carried by the blow-head support in alignment with said mold and movable into engagement therewith by the blow-head, and means for holding said pouring guide above and clear of said mold.

2. A glass working machine comprising a rotatable table, a plurality of sets of molds mounted on the table, each set comprising a blank mold and a blow mold, means for intermittently moving said sets of molds past a plurality of stations, mouth forming means at the charging station arranged to be moved upwardly into the mouths of the blank molds as they are successively brought to said station, means at said charging station for forcing the glass into the molds as they are successively brought to said station to partially form the parisons, means for finishing the parisons in the blank molds as they are successively brought to another station, there being a transfer station beyond the parison finishing station, at which the blown bottles are removed from the blow-molds as they are successively brought thereto and the finished parisons placed therein, and a bottle blowing device at another station beyond the transfer station for finishing the bottles in the blow molds as they are successively brought to said station, substantially as described.

3. A glass working machine comprising a rotatable table, four sets of molds mounted on the table, each set comprising a blank mold with its mouth extending downwardly and a blow mold with its mouth extending upwardly, means for intermittently moving the sets of molds past a plurality of stations, means for partially forming the parisons in the blank molds at the charging station as they are successively brought to said station, means for finishing the parisons in the blank molds as they are successively brought to another station, there being a transfer station beyond the parison finishing station at which the blown bottles are removed from the blow molds as they are successively brought thereto, and the finished parisons placed therein, and means at the charging station for finishing the bottles in the blow molds as they are successively brought to the charging station to charge the adjacent blank molds, substantially as described.

4. A glass working machine comprising a rotatable table, a plurality of sets of molds mounted on the table, each set comprising a blank mold and a blow mold, means for intermittently moving the sets of molds past a plurality of stations, means for partially forming the parisons in the blank molds at the charging station as they are successively brought to said station, means for finishing the parisons in the blank molds as they are successively brought to another station, there being a transfer station beyond the parison finishing station, and means at the charging station for finishing the bottles in the blow molds as they are successively brought to the charging station to charge the adjacent blank molds, substantially as described.

5. In a glass forming machine, the combination of a rotatable table provided with preliminary blowing molds, a fluid pressure actuated table mover for advancing the table from station to station, glass cutting shears, fluid pressure actuated means for operating said shears, fluid pressure actuated devices at one station for forming the neck in a blank, a fluid pressure actuated blank blower at another station, means including a timing valve rendered operative by the movement of the shears for moving one of the neck-forming devices to and from the mold, means including a valve rendered operative by the movement of the shears and simultaneously with the last named means for setting in operation one of said neck-forming devices, and means rendered operative by the concluding movement of one of the forming devices for setting said table mover in operation.

6. In a glass forming machine, the combination of a rotatable table provided with preliminary blowing molds, a fluid pressure actuated table mover for advancing the table from station to station, glass cutting shears, fluid pressure means for operating said shears, a reciprocatory fluid pressure actuated rod at one station and above a mold for blowing glass to the bottom of the mold to form the neck, a reciprocatory fluid pressure actuated neck former at said station and below the table, a fluid pressure actuated glass blower at another station for blowing a blank, means including a timing valve rendered operative by the movement of the shears for moving said rod to and from a mold, means including a valve rendered operative by the movement of the shears and simultaneously with said last named means for setting in operation said neck former and said glass blower, and means rendered operative by the concluding movement of one of said neck formers for setting said table mover in operation.

7. In a glass forming machine, the combination of a rotatable table provided with preliminary blowing molds, a reciprocatory fluid pressure actuated table-moving device including a piston rod, glass cutting shears, a fluid pressure actuated rod above the table for blowing glass to the bottom of a mold, a fluid pressure actuated reciprocatory neck-former below the table, means including a timing valve operative upon the concluding movement of the shears for causing said rod to descend and rise, independent means operative simultaneously with said last named means for causing said neck-former to move downwardly, means operative upon the downward movement of the neck-former for causing said table moving device to move in one direction, and means operative at the end of the movement of the piston rod for causing said neck-former to move upwardly.

8. The combination, in a glass working machine, of a series of inverted blank molds adapted to be successively moved to a charging station and a parison blowing station, fluid actuated means for intermittently moving said molds to said stations, a neck former at the charging station below the blank mold, fluid actuated means for moving the neck former with relation to the molds, a blow down device at the charging station, fluid actuated means for moving the blow down device with relation to the molds, a parison blowing device at the parison blowing station, fluid actuated means for moving the parison blowing device with relation to the molds, a cover for the molds at the parison blowing station, fluid actuated means for moving the cover with relation to the molds, valves for automatically controlling the flow of fluid pressure to and exhaust from all of said fluid actuated means including a timing device, a shearing device at the charging station, fluid actuated means for the shearing device, a valve controlled by the movement of the shearing device for shifting the automatic valves to actuate the blank forming devices and mold moving devices in timed relation to each other, and means for setting the fluid actuating means for the shearing device into operation.

9. A glass working machine having a table, a plurality of blank molds on said table adapted to be successively moved to a charging station and a parison blowing station, fluid actuated means for intermittently moving said table to bring the molds to said stations, a neck former at the charging station below a blank mold, fluid actuated means for moving the neck former with relation to the mold, a blow down device at the charging station, fluid actuated means for moving the blow down device with relation to the molds, a parison blowing device at the parison blowing station, fluid actuated means for moving the parison blowing device with relation to the molds, a cover for the molds at the parison blowing station, fluid actuated means for moving the cover with relation to the molds, valves for automatically controlling the flow of fluid pressure to and exhaust from all of said fluid actuated means, including a timing device, said valves being arranged so that all of the blank forming devices with the exception of the blow down device are in contact with the molds when the mold at the charging station is being charged, a shearing device at the charging station, fluid actuated means for the shearing device, a valve controlled by the movement of the shearing device for shifting the automatic valves to move the blow down device into blowing relation with the blank mold at the charging station and to then move said blow down device from the mold and to move the other devices from the molds and to then shift the table after which all of said forming devices are again moved into contact with the molds with the exception of the blow down device, and means for setting the fluid actuated means for the shearing device into operation.

10. In a glass blowing machine, the combination with a controller cylinder, a controller piston mounted to work therein, a table arranged for rotation, a mold upon the table, a blowhead support, a blowhead normally in inactive position thereon, valve controlled means for directing pressure against the piston to shift it in one direction to move the blowhead to active position, the movements of the piston controlling air from the blowhead, and the movement of the table bringing the bottom of the mold into registry with the blowing means substantially as described.

11. A glass blowing machine comprising a mold, a pouring guide support positioned above the mold, a pouring guide mounted therein to fit over the mold, a blowhead mounted above said pouring guide adapted for movement to close the pouring guide, means for conducting air to the blowhead, and means for holding said pouring guide and blowhead on said mold, substantially as described.

12. In a glass blowing machine, the combination of a rotatable table provided with blowing molds, a fluid pressure actuated table mover for advancing the table from station to station, glass cutting shears, fluid pressure actuating means for operating said shears, fluid pressure actuated devices for forming the neck in a blank at one station, a fluid pressure actuated blower at another station, means including a timing valve for moving one of the neck forming devices to and from the mold, means including a valve for setting in operation one of said neck forming devices, and means operative after the withdrawal of one of the neck forming devices for setting said table mover in operation, substantially as described.

13. A glass blowing machine comprising a rotating table, and a series of molds arranged thereon for simultaneous operation, said molds having open tops to receive the gathers, a regulator, means controlled by the regulator for blowing air into the top of a mold, means for locking the table during the air blowing, said table locking means being under the control of said regulator for unlocking the table at the end of the blowing, and a control device for said regulator for blowing air into the top of a mold a length of time which can be adjusted to suit the working conditions, substantially as described.

14. A glass blowing machine comprising a rotating table, and a series of molds arranged thereon for simultaneous operation, said molds having open tops to receive the gathers, a cutting device for severing the gathers, an operating valve, means for setting the operating valve to operate the cutting device, a regulator controlled by the operating valve, means controlled by the regulator for blowing air into the top of a mold, means for locking the table during the cutting operation and air blowing, said table locking means being under the control of said regulator for unlocking the table at the end of the blowing, and a control device for said regulator for blowing air into the top of a mold a length of time which can be adjusted to suit the working conditions, substantially as described.

15. A glass blowing machine comprising, a regulator for timing the operation of the blowing devices, adjustable means for controlling the speed of movement of said regulator, an operating valve for controlling said regulator, means for throwing said operating valve to start the operation of the machine, and means set in operation by devices under the control of said regulator for effecting movement of said operating valve and devices controlled by said regulator to normal position, substantially as described.

16. In a bottle forming machine, the combination with an inverted parison mold having a charge opening at its upper end to receive a charge of molten glass, of blowing means to apply pressure through said opening for forming the neck of the bottle, a core or plunger to form an initial blow opening in said neck, means for blowing air through said blow opening in sufficient volume and pressure to blow the glass in the parison mold to hollow form to partially form the bottle in the parison mold, a finishing mold adapted to receive the partially blown parison, means for blowing the parison to final form in the finishing mold while the parison mold in which the parison is formed contains its next charge of glass, and means controlling the positioning of the two first named blowing means in predetermined timed relation and adjustable means for variably controlling and timing the duration of blow of at least one of said blowing means, substantially as described.

17. The combination, in a glass working machine, of a rotatable table, a series of blank molds carried thereby and adapted to occupy inverted position while receiving a charge of glass, means for moving the table, a blow-head positioned for registry with the successive blank molds, a pouring guide continuously supported by said machine for successively registering with the blank molds during the operation of the machine, and shearing means co-operating with the pouring guide, said blow-head being supported for registry with the pouring guide for blowing air therethrough into the blank molds, substantially as described.

18. A glass working machine having a blank forming mold, a movable pouring guide continuously supported by said machine and adapted to seat upon the receiving end of the mold, said mold having a seating surface for the pouring guide, a blow pipe for supplying air to the mold, a bell on the end of the blow pipe arranged to seat on the upper face of the pouring guide, means for moving said blow pipe to move the bell into contact with the pouring guide and clamp the pouring guide between the head and the mold and means for timing the operation of said means, substantially as described.

19. A glass working machine having a blank mold, a movable pouring guide continuously supported by said machine and adapted to seat on the receiving end of the mold, said pouring guide having an upper seating surface, a hollow rod for supplying air to the mold, a bell loosely mounted on the lower end of the rod, said bell having a lower surface adapted to be seated upon the upper surface of the pouring guide, means for making a tight joint between the rod and the bell, the rod having air delivery means discharging within said bell, and timing means for moving said rod to move the bell into contact with the pouring guide and clamp the pouring guide between the bell and the mold, substantially as described.

20. The combination in a glass working machine, of a rotatable table, a series of molds carried thereby, neck molds carried with said molds, means for moving said table, a movable pouring guide continuously supported by said machine for registry with successive molds as the table is moved, a movable blow-head for registry with the pouring guide, means for moving the blow-head to deliver pressure to a charge of glass in a mold and force the glass therein into the neck mold, and a blowing device for aligning with the neck end of the mold to blow the compacted glass therein, substantially as described.

21. In a glass blowing machine, a series of blank molds and associated neck molds, a carrier for said molds rotatable to move the molds through a closed path in which the blank molds in inverted position successively receive charges of glass, automatic means to rotate the carrier, means for compacting the charges of glass in the blank molds and associated neck molds, means for counterblowing the charges of glass to form hollow blanks, means for closing the bottom ends of the blank molds during counterblowing, automatic means for timing the compacting and counterblowing to counterblow the charges at equal time intervals after the compacting thereof and to counterblow a charge in one blank mold while compacting a succeeding charge in another blank mold, a series of blow molds, and means for blowing the charges to final form in the blow molds.

22. In a glass blowing machine, a series of blank molds and associated neck molds, a carrier for said molds rotatable to move the molds through a closed path in which the blank molds while inverted successively receive charges of glass, means for compacting the charges of glass in the blank molds and neck molds, means for counterblowing the charges of glass, means for closing the bottom ends of the blank molds during counterblowing, automatic means for controlling the compacting and timing the counterblowing to counterblow the charges at equal time intervals after the compacting thereof, means automatically to effect rotation of the carrier between the compacting and counterblowing of each charge, a series of blow molds, and means for blowing the charges to final form in the blow molds.

23. In a glass blowing machine, a series of blank molds, neck molds associated therewith, a member carrying said blank molds and rotatably mounted to bring said blank molds to a plurality of different stations, means acting automatically to rotate the member, means for charging said blank molds successively at one of said stations, means for compacting the charge of glass in each blank mold at said station, means for moving said member to bring each such mold thereafter to another station, and a succeeding mold to the first station, means for counterblowing the charge of glass in such blank mold at such other station, means for closing the bottom ends of the blank molds during counterblowing, automatic means for timing the operations of the compacting and counterblowing means to assure regular spaced time intervals between compacting and counterblowing of successive charges, a series of blow molds, and means for finish blowing the blanks in the blow molds.

24. In a bottle forming machine, the combination with an inverted parison mold having a charge opening at its upper end to receive a charge of molten glass, of means to apply pressure through said opening for forming the neck of the bottle, a core or plunger to form an initial blow opening in said neck, means for blowing air through said blow opening in sufficient volume and pressure to blow the glass in the parison mold to hollow form to partially form the bottle in the parison mold, a finishing mold adapted to receive the partially blown parison and means for blowing the parison to final form in the finishing mold while pressure is being applied through the upper end of the parison mold in which said parison was formed to form the neck of the next succeeding parison to be formed in that mold, and means controlling the positioning of the blowing means in predetermined time relation and for timing the duration of blow of at least one of said blowing means.

25. In a glass working machine, a blank mold, a member carrying said mold and movably mounted to bring the same to a plurality of different stations, shearing means for the glass, operating connections therefor, said mold being adapted to receive a charge at one of said stations, means for subjecting one end of said charge of glass in the blank mold to air pressure to compact the glass therein in timed relation to a movement of the shearing means, adjustable timing mechanism for said means, means for moving said member to another station, means at such other station for subjecting the opposite end of the charge of glass in said mold to air pressure to form the parison, a blow mold, and means for finishing the parison in the blow mold, substantially as described.

26. A glass forming machine comprising in combination a mold carriage, molds thereon, shearing means, power means acting automatically to rotate said carriage in timed relation to a movement of the shearing means, said molds being arranged with their upper ends open to receive charges of glass from said shearing means, a blow head, automatic means to move the blow head into position to close a mold after a charge of glass has been received therein and in predetermined timed relation to a movement of the shearing means, means to apply air pressure through said head to the glass in the mold, a mold closing head, means to move said head into position to close the mold after said blow head has operated, and carrying means for said blow head and said mold closing head, substantially as described.

27. In an organized machine for making glass containers, shear mechanism arranged to sever descending glass above the level of an inverted parison mold and in predetermined spaced relation thereto, a series of parison molds, providing spaced inverted cavities into which the sheared mold charges are fed in a certain predetermined order, mouth forming pin mechanism arranged to close the mouth ends of the parison cavities when the glass charges are packed therein, connections arranged to bring the shear mechanism and the parison molds into cooperative charging relation in a predetermined order, a blow head positioned for cooperation with successive molds, a pouring guide positioned for registry with the successive molds, said blow head being adapted to be brought into operative position after operation of the shear mechanism, and an adjustable regulator for timing the duration of blow of said blow head.

28. In an organized machine for making glass containers, shear mechanism arranged to sever descending glass above the level of an inverted parison mold and in predetermined spaced relation thereto, a series of parison molds, providing spaced inverted cavities into which the sheared mold charges are fed in a certain predetermined order, mouth forming pin mechanism arranged to close the mouth ends of the parison cavities when the glass charges are packed therein, connections arranged to bring the shear mechanism and the parison molds into cooperative charging relation in a predetermined order, a blow head positioned for cooperation with successive molds, locking means for holding a mold and blow head in cooperative relation, a pouring guide positioned for registry with successive molds, said blow head being adapted to be brought into operation after operation of the shear mechanism, and an adjustable regulator for timing the duration of blow of said blow head and for controlling the period of locking of said locking means.

29. An organized glass working machine as defined in claim 27 characterized by controlling the operative positioning of the blow head by the shear mechanism.

30. In an organized machine for making glass containers, shear mechanism arranged to sever descending glass above the level of an inverted parison mold and in predetermined spaced relation thereto, a series of parison molds providing spaced inverted cavities into which the sheared mold charges are fed in a certain predetermined order, connections arranged to bring the shear mechanism and the parison molds into cooperative charging relation in a predetermined order, mouth forming pin mechanism arranged to close the mouth end of the parison cavities of the molds at predetermined times to limit the descent of glass charges therein, a blow head positioned for cooperation with successive molds, a pouring guide positioned for registry with successive molds, said blow head being adapted to be brought into operative position after operation of the shear mechanism, and a regulator for timing the duration of blow of said blow head.

31. In an organized machine for making glass containers, shear mechanism arranged to sever descending glass above the level of an inverted parison mold, a series of parison molds providing spaced inverted cavities into which the sheared mold charges are fed in a certain predetermined order, mouth forming pin mechanism arranged to close the mouth ends of the parison cavities, connections arranged to bring the shear mechanism and the parison molds into cooperative charging relation in a predetermined order, a regulator, means controlled by the regulator for blowing air into the top of a mold, means for locking the parts during the air blowing, said locking means being under the control of said regulator for unlocking the parts at the end of the blowing, and a control device for said regulator for blowing air into the top of a mold a length of time which can be adjusted to suit working conditions.

32. In an organized machine for making glass containers, shear mechanism arranged to sever descending glass above the level of an inverted parison mold, a series of parison molds providing spaced inverted cavities into which the sheared mold charges are fed in a certain predetermined order, mouth forming pin mechanism arranged to close the mouth ends of the parison cavities, when the glass charges are packed therein, connections arranged to bring the shear mechanism and the parison molds into cooperative charging relation in a predetermined order, a regulator, means for blowing air into the top of a mold to pack the glass charges therein, means for blowing air into the opposite end of the mold for blowing the packed charges to hollow form, at least one of said blowing means being controlled by said regulator, means for locking the parts during the air blowing, said locking means being under the control of said regulator for unlocking the parts at the end of the blowing, and a control device for said regulator for blowing air through at least one of said blowing means a length of time which can be adjusted to suit working conditions.

33. In an organized machine for making glass containers, in combination with a single shear mechanism arranged to sever descending glass above the level of inverted parison molds, a series of parison molds providing spaced inverted cavities into which successively sheared mold charges are fed in a certain predetermined order, neck molds cooperating with said parison molds, mouth forming pin mechanism arranged to project through said neck molds and close the mouth ends of the parison forming cavities when the glass charges are received and packed therein, means for establishing a fluid pressure differential in the opposite ends of a charged parison mold to pack the charge therein and form the mouth of the container around the mouth forming pin, and for thereafter applying fluid pressure of sufficient volume and pressure to blow the packed charge into a parison in the parison mold, closure means for the bottom ends of the parison molds, means for bringing the closure means and the parison molds into cooperative relation so that the glass charges are confined during the parison blow, connections arranged to successively establish a cooperative charging relation between each of said parison molds and said shear mechanism, power connections arranged for establishing and maintaining said fluid pressure differential in the parison molds for definite and uniform periods of time and for thereafter applying and maintaining said fluid pressure to blow the packed charges into parisons in the parison molds for definite and uniform periods of time, said connections acting to establish such differential pressures and such parison blowing on charge in predetermined time relation to each other, a series of neck end up finishing molds adapted to receive the blown parisons from the parison molds, and means for blowing the parisons to final form while in upright position in the finishing molds.

34. In an organized machine for making glass containers, in combination with a single shear mechanism arranged to sever descending glass above the level of inverted parison molds, a circular series of parison molds providing spaced inverted cavities which successively receive the sheared mold charges in a certain predetermined order from the shear mechanism, mouth forming pin mechanism arranged to close the mouth ends of the parison mold cavities when the glass charges are packed therein, means for establishing a fluid pressure differential in the opposite ends of a charged parison mold to pack the charge therein and form the mouth of the container around the mouth forming pin, and for thereafter applying fluid pressure of sufficient volume and pressure to blow the packed charge into a parison in the parison mold, means for closing the bottom ends of the parison molds so that the glass charges are confined during the parison blow, connections arranged to bring the shear mechanism and the parison molds into cooperative charging relation in said predetermined order power means acting automatically and without intervention of the operator for establishing said fluid pressure differential in each parison mold and for thereafter applying said fluid pressure to blow the packed charge into a parison in each parison mold in predetermined order and in predetermined time relation to each other and to a movement of the shear mechanism, a circular series of finishing molds adapted to receive the blown parisons from the parison molds, and means for blowing the parisons to final form in the finishing molds.

35. An organized machine as defined in claim 34 characterized by the provision of means for locking the parison mold and the charging system in cooperative relation during the charging operation.

36. The method of forming hollow glassware which comprises successively and sequentially delivering charges of glass to a series of inverted blank molds having neck molds associated therewith, successively and sequentially compacting the charges in the blank and neck molds throughout equal time intervals and while the neck molds are closed by neck forming mechanism, closing the bottoms of said blank molds and successively and sequentially counterblowing the charges into hollow blanks in said molds during equal time intervals while confining the charges in said molds, the operations of counterblowing of the charges being initiated at equal time intervals after termination of the operations of compacting respectively, and the counterblowing of a charge in one mold being effected while compacting a succeeding charge in another mold, transferring the blanks successively and sequentially to finishing molds supporting each blank within the cavity of its closed finishing mold but out of contact with the walls of such mold for a period of time during which the transfer of the next succeeding blank to its finishing mold takes place, and thereafter blowing the blanks to final form in the finishing molds.

37. The method of forming hollow glassware which comprises successively and sequentially delivering charges of glass to a series of inverted blank molds having neck molds associated therewith, successively and sequentially compacting the charges in the blank and neck molds throughout equal time intervals, closing the bottoms of said blank molds and successively and sequentially counterblowing the charges into hollow blanks in said molds during equal time intervals, the operations of counterblowing of the charges being initiated at equal time intervals after termination of the operations of compacting respectively, transferring the blanks successively and sequentially to finishing molds, successively and sequentially blowing the blanks to final form in said finishing molds, and blowing each mold to final form in a finishing mold while the blank mold in which said blank was formed contains its next charge of glass.

38. The method of forming hollow glassware which comprises successively and sequentially delivering charges of glass to a series of inverted blank molds having neck molds associated therewith, successively and sequentially compacting the charges in the blank and neck molds throughout equal time intervals, closing the bottoms of said blank molds and successively and sequentially counterblowing the charges into hollow blanks in said molds during equal time intervals, the operations of counterblowing of the charges being initiated at equal time intervals after termination of the operations of compacting respectively, transferring the blanks successively and sequentially to finishing molds, successively and sequentially blowing the blanks to final form in said finishing molds, and blowing each blank to final form in a finishing mold while a succeeding charge is being compacted in the mold in which said blank was formed.

39. The method of forming hollow glassware which comprises successively and sequentially delivering charges of glass to a series of inverted blank molds having neck molds associated therewith, successively and sequentially compacting the charges in the blank and neck molds throughout equal time intervals, closing the bottoms of said blank molds and successively and sequentially counterblowing the charges into hollow blanks in said molds during equal time intervals, the operations of counterblowing of the charges being initiated at equal time intervals after termination of the operations of compacting respectively, transferring the blanks successively and sequentially to finishing molds, successively and sequentially blowing the blanks to final form in said finishing molds, and cooling each finished article in a finishing mold while counterblowing a charge in the mold in which said blank was formed.

40. In a glass working machine, a plurality of blank molds, a rotatable table supporting said molds, means for rotating said table, blank blowing means cooperating with said molds, means for timing the duration of blow of said blank blowing means, and means for varying the duration of blow for said blank blowing means while said machine is in operation and while maintaining the speed of movement of said table substantially constant.

41. In a glass forming machine, the combination of a rotatable table provided with preliminary blowing molds, a fluid pressure actuated table mover for advancing the table from station to station, glass cutting shears, fluid pressure means for successively closing and opening said shears, fluid pressure actuating means including a reciprocatory rod for forming, at one station, a neck in the glass, a valve for timing the movement of said rod, fluid pressure actuated means at another station for blowing a blank, means rendered operative by the movement of the shears for simultaneously setting in operation said neck forming and said blowing means, and means rendered operative by the movement of said rod for setting said table mover in operation.

42. In a glass blowing machine, the combination of a rotatable table provided with blowing molds, a fluid pressure actuated table mover for advancing the table from station to station, glass cutting shears, fluid pressure actuating means for operating said shears, fluid pressure actuated devices for forming the neck in a blank at one station, a fluid pressure actuated blower at another station, means including a timing valve for moving one of the neck forming devices to and from the mold, means including a manually operable valve for setting in operation one of said neck forming devices, and means operative after the withdrawal of one of the neck-forming devices for setting said table mover in operation, substantially as described.

43. An organized machine as defined in claim 34 characterized by a charging system including guiding means for guiding the sheared charges into the parison molds.

44. In a glass forming machine, a series of parison molds, a series of blow molds adapted to receive blown blanks from the parison molds, carrying means for all of said molds, forming devices cooperating with said parison molds and including fluid pressure blank blowing means for blowing a blank to hollow form therein, timing means controlling the operation of said forming devices, means for varying the timing of duration of operation of said forming devices, including the blowing means for blowing the blank to hollow form, while said machine is in operation and while maintaining the speed of movement of said carrying means substantially constant, and means for blowing the transferred blanks to final form in the blow molds.

45. In a glass working machine, an open bottom parison mold, means for supporting said mold in inverted position while receiving glass through its open bottom end, a shearing mechanism for the glass, means automatically controlled and set in operation by the shearing mechanism and operable subsequent thereto for applying fluid pressure to said bottom end to form the neck end of the article and compact the glass, a neck pin to form an initial blow opening in such neck end, means for closing the bottom end of the mold, means for applying fluid pressure to the compacted glass through the neck end of the mold to form a hollow parison, a blow mold adapted to receive said parison, and means for blowing the parison in the blow mold.

46. In a glass working machine, an open bottom parison mold, means for supporting said mold in inverted position while receiving glass through its open bottom end, a shearing mechanism for the glass, means automatically controlled by the shearing mechanism and operable subsequent thereto for applying fluid pressure to said bottom end after a glass charge has been supplied to the mold to form the neck end of the article and compact the glass, a neck pin to form an initial blow opening in such neck end, means for moving the parison mold with the glass compacted therein to another station, means at such other station for applying fluid pressure to the neck end of the mold to form a parison, a blow mold adapted to receive said parison, and means for blowing the parison in the blow mold.

47. In a glass working machine, a blank mold, a member carrying said mold and movably mounted to bring the same to a plurality of different stations, means at one of said stations for shearing a charge of glass for said blank mold, means automatically controlled by said shearing means and operable subsequent thereto for subjecting one end of the charge of glass in said blank mold to air pressure at said station to compact the glass, means for moving said member to another station, means for subjecting the opposite end of the charge of glass in said blank mold to air pressure at such other station to form a parison, a blow mold, and means for blowing the parison in the blow mold.

48. The combination, in a glass working machine, of a series of inverted blank molds adapted to be successively moved to a charging station and a parison blowing station, fluid actuated means for intermittently moving said molds to said stations, a neck former at the charging station below the blank molds, fluid actuated means for moving the neck former with relation to the molds, a blow down device at the charging station, fluid actuated means for moving the blow down device with relation to the molds, a parison blowing device at the parison blowing station below the molds, fluid actuated means for moving the parison blowing device with relation to the molds, a cover for the molds at the parison blowing station, fluid actuated means for moving the cover with relation to the molds, valves for automatically controlling the flow of fluid pressure to and exhaust from all of said fluid actuated means, a shearing device at the charging station, fluid actuated means for the shearing device, a valve controlled by the movement of the shearing device for shifting the automatic valves to actuate the blank-forming devices and mold moving devices in timed relation to each other, and a valve under the control of the operator for setting the fluid actuating means for the shearing device into operation.

49. The combination in a glass working machine, of a series of inverted blank molds adapted to be successively moved to a charging station and a parison blowing station, a plurality of blow molds, a bottle blowing station, fluid actuated means for intermittently moving the molds to said station, a neck former at the charging station below the blank molds, fluid actuated means for moving the neck former with relation to the molds, a blow down device at the charging station, fluid actuated means for moving the blow down device with relation to the molds, a parison blowing device at the parison blowing station below the molds, fluid actuated means for moving the parison blowing device with relation to the molds, a cover for the molds at the parison blowing station, fluid actuated means for moving the cover with relation to the molds, a bottle blowing device at the bottle blowing station, fluid actuated means for moving the bottle blowing device with relation to the blow molds, valves for automatically controlling the flow of fluid pressure to and exhaust from all of said fluid actuated means, a shearing device at the charging station, fluid actuated means for the shearing device for shifting the automatic valves to actuate the blank forming devices, the bottle blowing device and mold moving devices in timed relation to each other, and a valve under the control of the operator for setting the fluid actuating means for the shearing device into operation.

50. The combination, in a glass working machine, of a series of blank molds adapted to be successively moved to a charging station and a parison blowing station, means for supporting said molds in inverted position at the charging station, fluid actuated means for intermittently moving said molds to said stations, a neck former at the charging station below the blank molds, fluid actuated means for moving the neck former with relation to the molds, a blow-down device at the charging station, fluid actuated means for moving the blow-down device with relation to the molds, a parison blowing device at the parison blowing station, fluid actuated means for moving the parison blowing device with relation to the molds, a cover for the molds at the parison blowing station, fluid actuated means for moving the cover with relation to the molds, valves for automatically controlling the flow of fluid pressure to and exhaust from all of said fluid actuating means, a shearing device at the charging station, a fluid actuated means for the shearing device, a valve controlled by the movement of the shearing device for shifting the automatic valves to actuate the blank forming devices and mold moving devices in timed relation to each other, and a valve for setting the fluid actuating means for the shearing device into operation.

51. The combination, in a glass working machine, of a series of blank molds adapted to be successively moved to a charging station and a parison blowing station, means for supporting said molds in inverted position at the charging station, a plurality of blow molds, a bottle blowing station, fluid actuated means for intermittently moving the molds to said stations, a neck former at the charging station below the blank molds, fluid actuated means for moving the neck former with relation to the molds, a blow-down device at the charging station, fluid actuated means for moving the blow-down device with relation to the molds, a parison blowing device at the parison blowing station, fluid actuated means for moving the parison blowing device with relation to the molds, a cover for the molds at the parison blowing station, fluid actuated means for moving the cover with relation to the molds, a bottle blowing device at the bottle blowing station, fluid actuated means for moving the bottle blowing device with relation to the blow molds, valves for automatically controlling the flow of fluid pressure to and exhaust from all of said fluid actuated means, a shearing device at the charging station, fluid actuated means for the shearing device, a valve controlled by the movement of the shearing device for shifting the automatic valves to actuate the blank forming devices, the bottle blowing device and mold moving devices in timed relation to each other, and a valve for setting the fluid actuating means for the shearing device into operation.

52. Organized glass working machinery comprising a series of blank molds and associated neck molds, shear mechanism for shearing descending glass to form mold charges, means for successively and sequentially establishing a cooperative charging relationship between said shear mechanism and said blank molds in a definite predetermined order so that successive charges of glass may be delivered successively to said blank molds in sequence, means for successively and sequentially applying pressure throughout equal intervals of time to said glass charges to compact the same in successive blank and neck molds, means operative at equal time intervals thereafter for successively and sequentially admitting and maintaining for definite periods of time, air pressure for counterblowing the compacted charges into hollow parisons while confined in the blank molds and while succeeding charges of glass are being compacted in succeeding blank molds timing means acting automatically to control the operation of the two last named means, a series of finishing molds, and means for successively and sequentially blowing the parisons to final form in the finishing molds.

53. Organized glass working machinery comprising a series of blank molds and associated neck molds, shear mechanism for shearing descending glass to form mold charges, means for successively and sequentially establishing a cooperative charging relationship between said shear mechanism and said blank molds in a definite predetermined order so that successive charges of glass may be delivered successively to said blank molds in sequence, means for successively and sequentially applying pressure throughout equal intervals of time to said glass charges to compact the same in successive blank and neck molds, means operative at equal time intervals thereafter for successively and sequentially admitting and maintaining for definite periods of time, air pressure for counterblowing the compacted charges into hollow parisons while confined in the blank molds and while succeeding charges of glass are being compacted in succeeding blank molds, timing means acting automatically to control the operation of the two last named means, a series of finishing molds, and means for successively and sequentially blowing the parisons to final form in the finishing molds, and means for maintaining each finished blown article in its closed finishing mold to cool the article, while a second charge of glass is being counterblown in the parison mold in which the parison for said finished article was formed.

54. In a glass working machine, the combination of a movable table, a plurality of parison molds carried by said table, shears arranged above the path of travel of said molds, a shear motor, a valve for controlling the shear motor, an arm for actuating said valve, means controlled by the shears on their opening stroke to operate a primary valve, said primary valve, a pneumatically operated secondary valve controlled by the primary valve, air pressure motors connected to various moving parts of the machine and controlled by the secondary valve, and connections operative for establishing a fluid pressure differential in the opposite ends of a charged parison mold to pack said charge therein.

55. In a glass working machine, the combination of a movable table, a plurality of parison molds carried by said table, shears arranged above the path of travel of said molds, a shear motor, a valve for controlling the shear motor, an arm for actuating the said valve, means controlled by the shears on the opening stroke to operate a primary valve, said primary valve, a pneumatically operated secondary valve controlled by the primary valve, air pressure motors, including a table moving cylinder, connected to various moving parts of the machine and controlled by the secondary valve, and connections operative for establishing a fluid pressure differential in the opposite ends of a charged parison mold to pack said charge therein.

BENJAMIN T. HEADLEY.
PARKE H. THOMPSON.

CERTIFICATE OF CORRECTION.

Patent No. 1,948,219.   February 20, 1934.

BENJAMIN T. HEADLEY, ET AL.

It is hereby certified that error appears in the printed specification of the above numbered patent requiring correction as follows: Page 4, line 108, for "relations" read relation; page 8, line 146, claim 33, before "charge" insert the word each; page 9, line 87, claim 37, for "mold" first occurrence, read blank; and that the said Letters Patent should be read with these corrections therein that the same may conform to the record of the case in the Patent Office.

Signed and sealed this 3rd day of April, A. D. 1934.

F. M. Hopkins (Seal)   Acting Commissioner of Patents.